(12) United States Patent
Erdman et al.

(10) Patent No.: US 8,483,191 B2
(45) Date of Patent: Jul. 9, 2013

(54) SYSTEM AND METHOD FOR SELECTIVELY MANIPULATING CONTROL TRAFFIC TO IMPROVE NETWORK PERFORMANCE

(75) Inventors: William D. Erdman, Cupertino, CA (US); Jeremy Stieglitz, Menlo Park, CA (US); Patrick Che' Gilbreath, Santa Clara, CA (US); Ian Foo, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1450 days.

(21) Appl. No.: 11/359,753

(22) Filed: Feb. 21, 2006

(65) Prior Publication Data

US 2007/0195742 A1    Aug. 23, 2007

(51) Int. Cl.
*H04W 4/00* (2009.01)
(52) U.S. Cl.
USPC .............. 370/338; 370/395.21; 455/452.2; 455/453; 455/512; 379/114.01
(58) Field of Classification Search
USPC ............. 370/338, 395.21; 455/452.2, 453, 455/512
See application file for complete search history.

(56) References Cited

U.S. PATENT DOCUMENTS

| | | | |
|---|---|---|---|
| 5,982,761 A | | 11/1999 | Dutta |
| 6,760,386 B2 | | 7/2004 | Li et al. |
| 2002/0042875 A1 | | 4/2002 | Shukla |
| 2003/0214905 A1* | | 11/2003 | Solomon et al. ............ 370/229 |
| 2004/0049570 A1 | | 3/2004 | Frank et al. |
| 2004/0166859 A1 | | 8/2004 | Hayashi et al. |
| 2005/0053046 A1 | | 3/2005 | Wang |
| 2005/0239458 A1 | | 10/2005 | Hurtta |
| 2006/0008063 A1* | | 1/2006 | Harnesk et al. .......... 379/114.01 |
| 2006/0029089 A1 | | 2/2006 | Zellner et al. |
| 2006/0140186 A1* | | 6/2006 | LoGalbo et al. ............. 370/390 |
| 2006/0146825 A1* | | 7/2006 | Hofstaedter et al. .......... 370/392 |
| 2007/0002868 A1* | | 1/2007 | Qian et al. ............... 370/395.21 |

FOREIGN PATENT DOCUMENTS

| | | |
|---|---|---|
| EP | 1408653 A1 | 4/2004 |
| FI | 0754395 B1 | 9/2003 |

OTHER PUBLICATIONS

Ali Hamidian and Ulf Körner, "Enhancing the IEEE 802.11e EDCA to Provide QoS Guarantees", Aquired at: http://perso.rd.francetelecom.fr/roberts/EuroNGIQoS/Papers/hamidian.pdf , 2 pages, Department of Communication Systems, Lund University.
"Cisco Wireless LAN Controllers", Aquired at http://www.cisco.com/en/US/products/ps6366/products_data_sheet0900aecd802570b0.html 13 pages, Copyright 1992-2006, Cisco systems, Inc.
European Search Report in Application No. 07716963.9 dated Dec. 7, 2010, 7 pages.

* cited by examiner

*Primary Examiner* — Wayne Cai
*Assistant Examiner* — Chuck Huynh
(74) *Attorney, Agent, or Firm* — Fish & Richardson P.C.

(57) ABSTRACT

A system and method for selectively controlling traffic in a network to improve network performance. The system includes a network controller that includes a first control-traffic prioritizer. An Access Point (AP) includes a second control-traffic prioritizer and communicates with the network controller. One or more clients communicate with the AP. The communications behavior of the client is affected by operations of the first control-traffic prioritizer and the second control-traffic prioritizer.

19 Claims, 3 Drawing Sheets

Fig. 3

SYSTEM AND METHOD FOR SELECTIVELY MANIPULATING CONTROL TRAFFIC TO IMPROVE NETWORK PERFORMANCE

BACKGROUND OF THE INVENTION

This invention is related in general to networks and more specifically to systems and methods for manipulating traffic in networks, such as wireless networks, to improve network performance.

Systems and methods for improving network performance and ensuring QOS in wireless networks are employed in various demanding applications, including cellular networks and Wireless Local Area Networks (WLANs). Such applications often demand systems for manipulating traffic that can ensure communications quality and QOS for high-priority communications.

Systems for ensuring QOS are particularly important in Voice-Over Internet Protocol (VOIP) and multimedia-conferencing applications employing WLANs, where signal degradation, network-roaming events, and faulty network Access Points (APs) may unacceptably degrade communications quality.

An exemplary WLAN includes mobile clients, such as laptops employing wireless network cards, that communicate with a network AP. An AP typically includes a transceiver for communicating with the wireless network cards by converting between wired and wireless signals. The AP often acts as a switch or router that facilitates connecting the clients into a broader network and may further facilitate connecting the clients to outside networks, such as the Internet.

A WLAN often includes a central controller that communicates with plural APs. Each AP is associated with a particular coverage area based on the range of the AP transceiver and the range of client transceivers that are communicating the AP.

A client device that traverses several coverage areas within a given WLAN is the to roam between the APs. When a client roams, the client connection to the network is handed off between APs as needed to maintain the client connectivity.

The central WLAN controller may facilitate handoff between APs and manage WLAN traffic. The controller may separate data and control traffic, and send control traffic to a processor and data traffic to a traffic-forwarding device.

Conventionally, a WLAN controller may prioritize data traffic according to predetermined Access Categories (ACs) to facilitate QOS guarantees in accordance with Wireless Multimedia Extensions (WME) techniques. WME, also known as Wireless-Fidelity (Wi-Fi) Multimedia (WMM), is a Wi-Fi Alliance interpretability certification based on the Institute of Electrical and Electronics Engineers (IEEE) 802.11e draft standard. WME provides basic QOS features to IEE 802.11 (Wi-Fi) networks. Unfortunately, WME methodologies often do not provide adequate QOS guarantees, especially in environments with plural roaming clients.

Furthermore, existing WLAN controllers often lack sufficient mechanisms to prevent one type of control traffic from overrunning another. Consequently, a faulty AP or an AP that is infected with a virus or worm may generate control messages that can overwhelm a central controller. An overwhelmed controller may compromise client-roaming, authentication, and/or other behaviors that require control signaling. Furthermore, an overwhelmed controller may have reduced ability to manage radio resources, which may degrade overall network QOS. Accordingly, the WLAN may drop data packets or delay connections when clients roam between APs of a WLAN that receives excess roam requests. Consequently, existing WLANs are often undesirably susceptible to dropped Voice-Over Internet Protocol (VOIP) phone calls, poor audio and video quality, and so on.

DETAILED DESCRIPTION OF EMBODIMENTS OF THE INVENTION

A preferred embodiment of the present invention implements a system and method for selectively controlling traffic in a wireless network. The system includes a network controller that includes a first control-traffic prioritizer. A wireless Access Point (AP) includes a second control-traffic prioritizer and communicates with the network controller. One or more clients communicate with the wireless AP. The communications behavior of the client is affected by operations of the first control-traffic prioritizer and the second control-traffic prioritizer.

For the purposes of the present discussion, a control-traffic prioritizer may be any device and/or software that can distinguish between different types of control signals and then selectively prioritize and/or use the control signals based on type. A control signal may be any signal that is employed to affect or control a component or characteristic of a network, such as network performance or behavior.

For clarity, various well-known components, such as power supplies, data-traffic signals, input/output modules, communications ports, hubs, modems, firewalls, network cards, Internet Service Providers (ISPs), and so on, have been omitted from the figures. However, those skilled in the art with access to the present teachings will know which components to implement and how to implement them to meet the needs of a given application.

Figure 1:
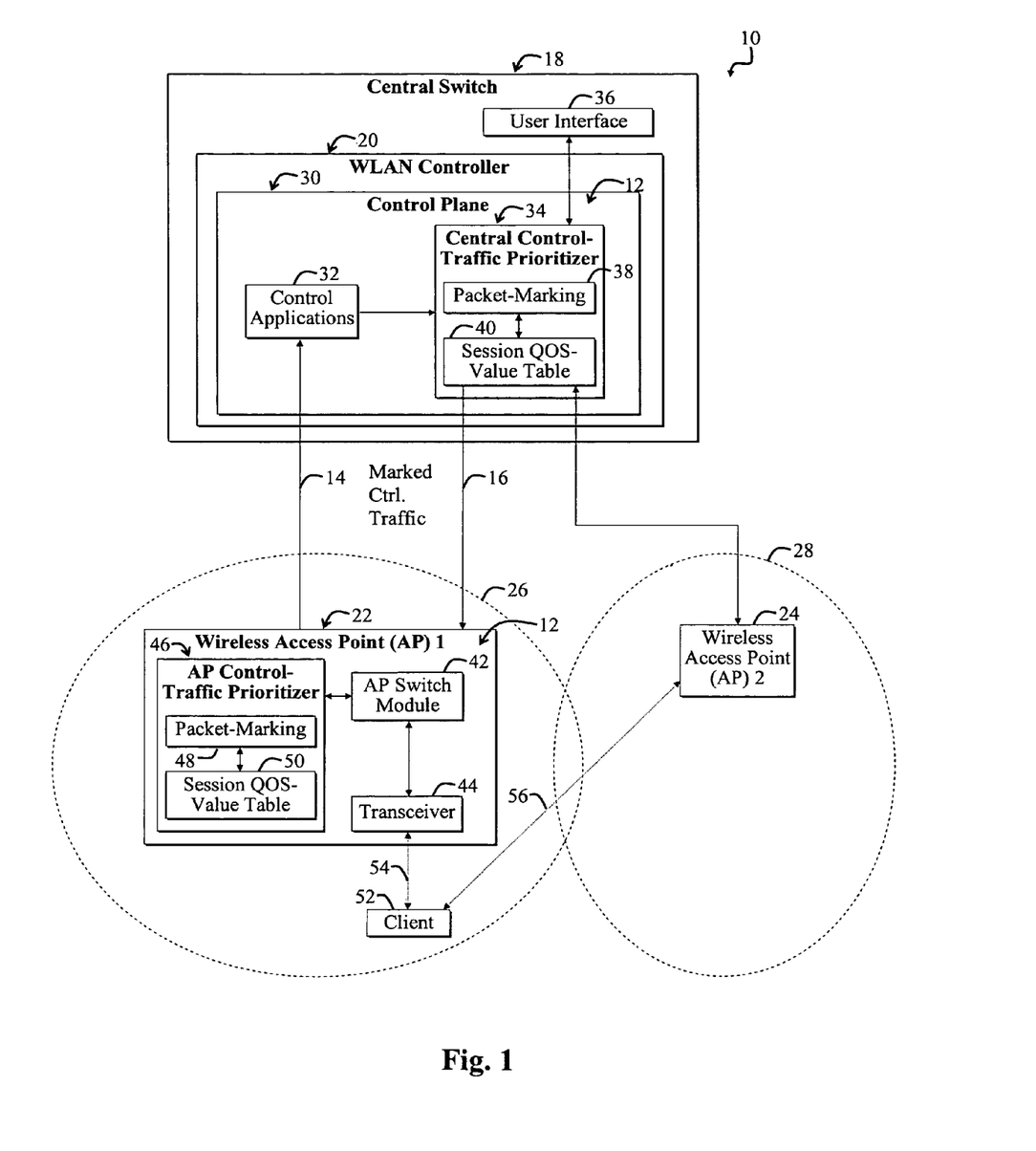
FIG. 1 is a diagram illustrating key functional blocks of a system for handling control traffic in a wireless network according to an embodiment of the present invention.

FIG. 1 is a diagram illustrating key functional blocks of system 12 for handling control traffic 14, 16 in wireless network 10 according to an embodiment of the present invention. For illustrative purposes, network 10 is shown including central switch 18, which includes Wireless Local Area Network (WLAN) controller 20. Central switch 18 communicates with first wireless access point 22 and second wireless access point 24, which are associated with first wireless coverage area 26 and second wireless coverage area 28, respectively.

The WLAN controller 20 includes control plane 30, which includes control applications 32 in communication with central control-traffic prioritizer 34. User interface 36 may be employed to communicate with central control-traffic prioritizer 34, which includes session Quality Of Service (QOS) value table 38 in communication with packet-marking module 40.

For the purposes of the present discussion, a control plane may represent functionality of the WLAN controller that pertains to the processing of control signals and/or associated network-control functionality and/or operations. Functions and operations of a WLAN controller are often logically and/or physically partitioned into a control plane, a data plane, and a management plane based on control, data, and management functions and/or operations.

First wireless AP 22 includes AP-switch module 42, which communicates with central switch 18 and AP transceiver 44. The range of transceiver 44 corresponds to size of first coverage area 26. Transceiver 44 facilitates wireless communications with clients, such as client 52 within first coverage area 26. Client 52 communicates with transceiver 44 via first wireless link 54, which is also called an Over-The-Air (OTA) link.

Wireless AP further includes AP control-traffic prioritizer 46. AP control-traffic prioritizer 46 includes AP packet-marking module 48 in communication with AP session-QOS-value table 50.

Second wireless AP 24 is constructed similarly to first wireless AP 22. However, for clarity, components of second AP 24 are not shown, since the operation of system 12 will be discussed primarily with reference to first wireless AP 26 and central switch 18.

For the purposes of the present discussion, a packet may be any grouping of information, such as a frame, message, and so on. A QOS value may be any parameter or other value representative of a priority. For example, on an increasing scale of 1-10 in terms of priority, a packet with a QOS value of 10 exhibits the highest priority. A QOS tag may be any identifier that is appended to, inserted in, or otherwise associated with a message or other data.

In operation, first client 52 is wirelessly connected to network 10 via the wireless communications link 54 between first client 52 and wireless AP 22. Various types of network comminations and behaviors, such as client roaming behaviors, power levels associated with transceiver 44, and so on, may require exchange of control signals, such as roam-request messages, between wireless APs 22, 24 and central switch 18.

AP control-traffic prioritizer 46 implements one or more routines that monitor communications passing through AP switch module 42. In the present specific embodiment, AP control-traffic prioritizer 46 separates control signals from data signals passing through AP switch module 42 and then employs AP packet-marking module 48 to selectively mark control signals based on the type of control signal detected by AP control-traffic prioritizer 46. When assigning a priority value, such as a QOS value to a control message or packet, AP packet-marking module 48 references AP session-QOS-value table 50, which defines QOS values which are to be assigned to specific types of control messages. For example, control messages pertaining to roam-requests may be marked with high QOS values, while control messages that are potentially produced by a faulty access point may be assigned low QOS values or may be otherwise discarded by AP control-traffic prioritizer 46.

Values within AP session-QOS-value table 40 and session QOS-value table 38 in central switch 18 maintain all QOS values for each current session for all OTA communication links 54, 56, in network 10.

Marked control packets or messages destined for central switch 18 are then forwarded from AP switch module 42 to central switch 18. Various control applications 32 running on the control-plane 30 of central WLAN controller 20 then process the marked, i.e., prioritized messages 14 received from wireless APs 22, 24 in accordance with the priorities, i.e., QOS values of the messages. The control applications may include radio-resource-management applications for controlling operation of transceiver 44 of wireless AP 22, mobility-management applications, security applications, QOS schemes, intrusion detection applications, and so on, as discussed more fully below. Control applications 32 may employ one or more queues to facilitate handing control messages based on QOS values associated with the messages.

After processing marked control traffic 14, control applications 32 may provide new control signals to the central control-traffic prioritizer 34. The central control-traffic prioritizer 34 employs the session QOS-value table 38 to selectively mark or control messages with QOS values based on control-message priority as determined via entries in the session QOS-value table 38. The entries in the session QOS-value table 38 include control-signal types, which are paired with QOS values. Consequently, a control message of a given type is assigned a given QOS value based on entries in the session QOS-value table 38. Contents of the session QOS-value table 38 may be forwarded, i.e. pushed to AP session QOS-value table 50 to maintain consistent control-signal priorities. Entries in AP session QOS-value table 50 are periodically populated via pushes from the session QOS-value table 38 running on central switch 18, to maintain similarities between QOS-value tables 38, 50. After control traffic is selectively differentiated and prioritized, i.e., marked with appropriate QOS values, the resulting marked control traffic 16 is forwarded to wireless APs 22, 24 for further handling.

The exact rules or relationships that determine which types of control traffic are assigned which priority values are application-specific. In the present specific embodiment, such rules are embodied by entries in session QOS-value tables 38, 50. The entries may be adjusted via the user interface 36. Alternatively, the entries may be automatically determined based on a predetermined rule. For example, central control-traffic prioritizer 34 may be configured to automatically assign priorities to control messages based on roam-request backlogs in accordance with an overall network QOS scheme that mandates that roaming clients will be guaranteed a certain QOS. In this example, central control-traffic prioritizer 34 may prioritize roam-requests above other types of control signals if needed to maintain session persistence for mobile client 52, in accordance with a QOS policy, as client 52 roams between coverage areas 26, 28.

When client 52 transitions from the first coverage area 26 to the second coverage area 28, wireless link 54 is terminated, and second wireless link 56 is established between client 52 and second wireless AP 24 in process called handoff. In a soft handoff, first wireless link 54 is maintained until second wireless link 56 is established. In a hard handoff, first wireless link 54 is terminated before or when the second link 56 is established. When client 52 transitions between coverage areas 26, 28, client 52 is the to roam between coverage areas. As known in the art, various types of control signaling, such as roam-request messages, may occur between wireless APs 22, 24 and central switch 18 to facilitate roaming behavior, such as by implementing handoffs.

Conventionally, roam-request messages and other control messages employed by a network to facilitate handoffs were not prioritized. Control messages were treated similarly to other types of control messages. Consequently, control signals generated from Web-browsing behavior or other types of network communications, such as from a compromised or faulty AP or a mis-configured QOS scheme, could overrun roam-request messages or other desirable control messages, preventing acceptable QOS for a specific type of communication operation. An overwhelmed controller will compromise the ability of a client to roam, authenticate, and/or further compromise performance of other network operations that require control signaling, and further degrade overall network QOS. Conventionally, network administrators lacked a mechanism enable QOS guarantees for different types of communications, such as Voice-Over-Internet-Protocol (VOIP) and/or video communications.

Certain embodiments of the present may enable selective prioritization of different types of control messages, preventing a controller from being overwhelmed by certain control messages, and thereby enabling an administrator to establish QOS guarantees for different types of network communications.

Furthermore, embodiments of the present invention may be employed to detect undesirable or questionable control traffic and either discard or assign low priorities to the less desirable control traffic. This prevents undesirable traffic, such as traffic from faulty APs, APs infected with malicious code, and so on, from destabilizing network 10 and compromising network QOS guarantees.

System 12, which includes central control-traffic prioritizer 34 and AP control-traffic prioritizer 46, is particularly useful for differentiating between different types of control traffic and then prioritizing the different types of control traffic based on application-specific requirements. The ability to prioritize traffic in control-plane 30 may enhance network capabilities. For example, a network administrator may decide to prioritize client reconnection requests based upon application, client, and roaming-behavior types to ensure QOS for a client while roaming. Furthermore, system 12 may be employed to thwart Denial-Of-Service (DOS) attacks wherein malicious control signals are sent to central witch 18 in an attempt to overrun central switch 18. Consequently, use of system 12 may improve network reliability, stability, and performance. Furthermore, system 12 may be employed to enhance the ability of network 10 to provide QOS guarantees for different types of network traffic and/or processes, such as handoff operations.

Overall QOS capabilities of a network, such as network 10, may be affected by control traffic. Conventionally, networks cannot prioritize for example, voice traffic over web traffic, and consequently cannot guarantee network functionality, such as seamless roaming functionality, that employs control signals. Prioritizing traffic according to certain embodiments of the present invention may enable network 10 to guarantee seamless roaming and other functionality as required for a given application.

While in the present specific embodiment only certain key functional modules are shown, more or fewer modules may be employed to implement embodiments of the present invention without departing from the scope thereof. For example, in certain applications wherein both data and control traffic are transferred between central switch 18 and wireless APs 22, 24, an additional traffic separator may be employed to separate data traffic and different types of control traffic. The traffic separator may send control traffic to control-plane 30 data traffic to a data-plane and/or forwarding engine so that the data traffic is unencumbered by control decisions.

Modules such as traffic separators and control-traffic prioritizers 34, 46 may be implemented via hardware and/or software modifications to existing network infrastructure. For example, central switch 18 may be implemented by those skilled in the art with access to the present teachings, via software and/or hardware modifications to a Cisco 4404 wireless LAN controller without undue experimentation.

System 12 may provide various additional benefits to network 10, including permitting greater centralization of WLAN switches without resulting in excessive control-plane delays that might be caused by one type of control traffic overrunning another; minimizing delays for high priority control signaling; and reducing cost and complexity of centralized WLAN solutions by enabling wireless infrastructure to effectively accommodate voice and data traffic on shared media. Previously, voice and/or video communications did not have sufficient priority in WLANs to adequately ensure QOS for certain voice and/or multimedia applications.

While in network 10 of FIG. 1, control traffic is tagged before egress from wireless APs 22, 24 and central switch 18, control traffic may be tagged and handled internally to APs 22, 24 and central switch 18 so that tags are not appended to messages sent Over The Air (OTA) as discussed more fully below.

Figure 2:
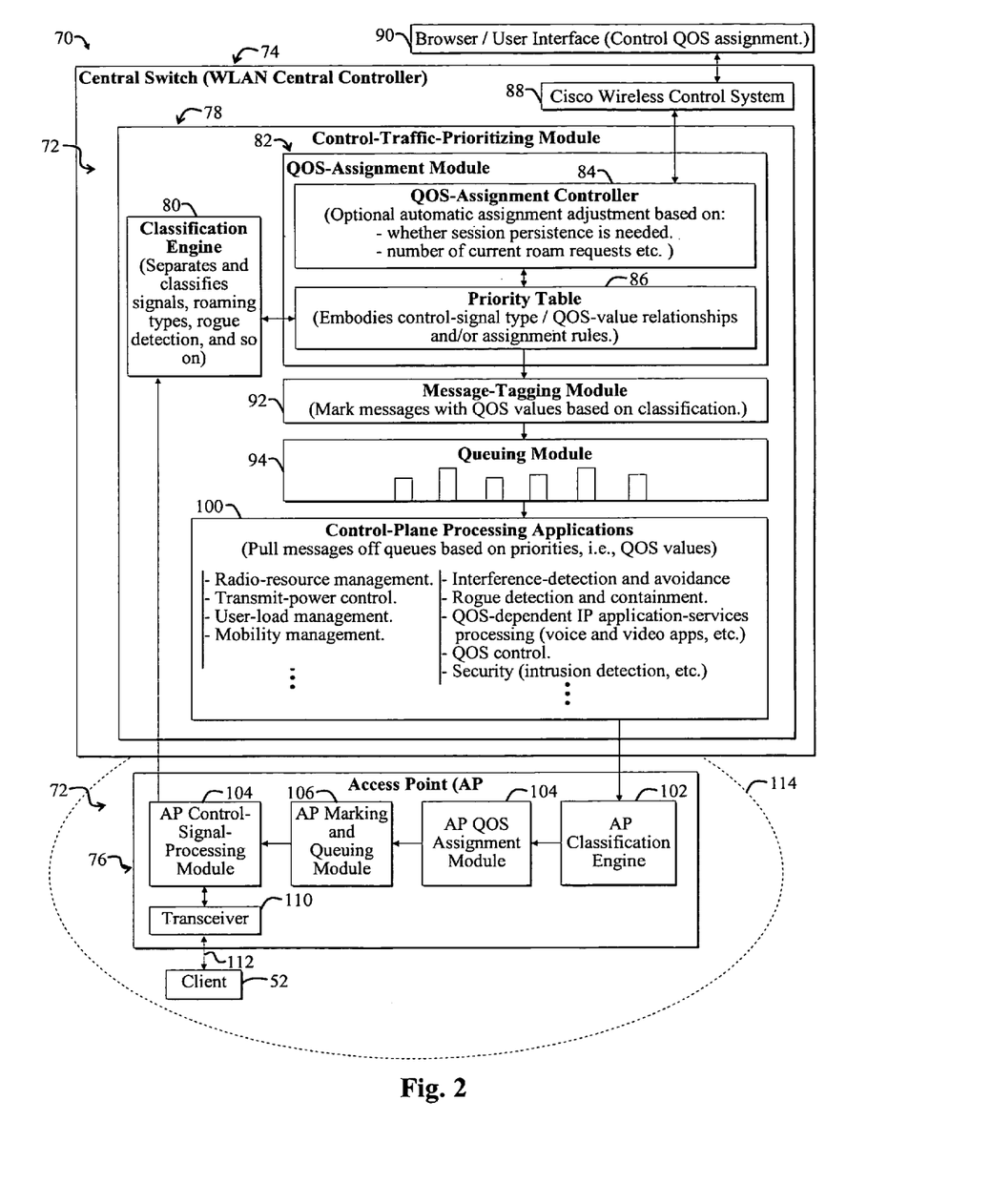
FIG. 2 is a more detailed diagram of an alternative embodiment of the system of FIG. 1.

FIG. 2 is a more detailed diagram of alternative embodiment 70 of network 10 of FIG. 1. Network 70 includes alternative system 72 for selectively prioritizing and handling control traffic in network 70.

Network 70 includes alternative WLAN central switch 74 in communication with alternative wireless AP 76. Unlike network 10 of FIG. 1, wherein control signals are prioritized and marked with QOS values before sending between central switch 18 and access points 22, 24, alternative central switch 74 and alternative wireless AP 76 mark control signals before processing. Hence, unlike network 10 of FIG. 1, control signals exchanged between alternative wireless AP 76 and alternative central switch 74 lack priority tags, i.e., QOS marks. Network 10 of FIG. 1 is adapted to mark controls signals with QOS values indicative of control-signal priority upon egress from central switch 18 and/or wireless APs 22, 24 of FIG. 1. In FIG. 2, control signals are prioritized and marked at alternative wireless AP 76 and alternative central switch 74 before processing at alternative wireless AP 76 and alternative central switch 74.

Alternative central switch 74 includes control-signal classification engine 80, which receives control signals from alternative wireless AP 76 and communicates classified control signals to QOS-assignment module 82 included in control-traffic prioritizing module 78.

QOS-assignment module 82 includes QOS-assignment controller 84 in communication with priority table 86. QOS-assignment controller 84 communicates with user interface 90 via wireless control system 88, which may be implemented via a Cisco Wireless Control System.

QOS-assignment module 82 further communicates with message-tagging module 92, which provides tagged messages to queuing module 94. Queuing module 94 implements various message queues 96 in which control messages are selectively placed based on tags, such as QOS tags, associated with the control messages.

Control-plane-processing applications 100 communicate with the queuing module 94 and selectively pull messages off the queues 96 for processing. Control-plane-processing applications 100 may forward signals to alternative wireless AP 76, which are received by AP control-signal classification engine 102.

Alternative wireless AP 76 further includes AP QOS-assignment module 104, which receives classified control signals from the AP classification engine 102. AP QOS-assignment module 104 communicates with AP marking-and-queuing module 106, which communicates with AP control-signal processing module 108. AP control-signal processing module 108 may implement various applications, such as resource management applications, for controlling behavior of accompanying wireless AP transceiver 110. AP control-signal processing module 108 may further communicate with alternative central switch 74.

In operation, control signals received by central switch 74 from alternative wireless AP 76 are classified by control-signal classification engine 80. In the present specific embodiment, control-signal classification engine 80 separates and classifies control signals by type. Exact classifications are application specific and may be determined to meet the needs of a given application by those skilled in the art without undue experimentation. Examples of possible control-signal classifications include roaming-type, rogue, and radio-resource control messages. For the purposes of the present discussion, a control message may be a control signal. The terms control signal and control message are employed interchangeably. A signal may be any information conveyed from one location or module to another, where the location or module may be physical or logical.

Control-signal classification engine 80 then forwards separated control traffic to QOS-assignment module 82, where messages of the control traffic are associated with priorities with reference to priority table 86. QOS-assignment controller 84 may automatically adjust the priority table 86 based on predetermined criteria, such as whether session persistence is required for roaming client 52 or the number of current roam requests currently being processed by central switch 74.

Prioritized messages are subsequently tagged with QOS values representative of message priority via message-tagging module 92. Tagging may involve inserting a QOS value in an existing message header; appending a QOS value to the message; or otherwise marking a message with a priority value.

Marked messages are then selectively placed in queues 96 via queuing module 94 based on the QOS tags associated with each message. Control-plane-processing applications 100 then remove messages from queues 96 based on priority values associated with each of queues 96. For example, control-plane-processing applications 100 may remove control messages from queues with high priority messages before removing control messages from queues with lower priority control messages. Exact details pertaining to methods by which control-plane-processing applications 100 remove control messages from queues 96 for processing are application specific. Such details may be readily determined to meet the needs of a given application by those skilled in the art with access to the present teachings.

Control-plane-processing applications 100 may include various applications that utilize control-plane traffic. Control-plane-processing applications 100 may include various hardware and/or software modules for implementing various functionality, such as radio-resource management, transmit-power control for wireless AP transceiver 110, and so on. Additional exemplary control-plane-processing applications include client-load management, mobility management, interference-detection and avoidance, rogue detection and containment, intrusion detection, QOS control, and QOS-dependent Internet Protocol (IP) application-services processing applications, such as for voice and video. System 72 of FIG. 2 may improve the operation of control-plane-processing applications 100 by helping to ensure that control traffic for one application does not overrun control traffic for a higher priority application.

After the prioritized control signals are processed by the control-plane-processing applications, newly generated control signals from control-plane-processing applications 100 are forwarded, unmarked, to alternative wireless AP 76.

While various modules 80-96 of control-traffic prioritizer 78 are shown as individual modules, modules 80-96 may be implemented via more or fewer modules without departing from the scope of the present invention. For example, modules 80-96 may be replaced with a single module implemented via a software modification to existing software running on a Cisco 4404 WLAN Controller.

Alternative wireless AP 76 communicates with client 52 and is associated with a general coverage area 114, which is affected by transceiver 110. AP QOS-assignment module 104 associates certain classifications of control signals received from central switch 74 with certain priorities. The priorities are reflected in QOS values or other priority tags, which are assigned to the control signals via the AP marking-and-queuing module 106. Tagged and prioritized control signals, i.e., control-plane messages or packets, are processed by AP control-signal-processing module 108 in accordance with QOS values associated with each message, packet, or signal. Processed control signals and/or other control signals that are generated based on processed control signals may be returned to central switch 74 by AP control-signal-processing module 108 or employed to control wireless AP transceiver 110 and associated communication link 112 between client 52 and alternative wireless AP 76.

Figure 3:
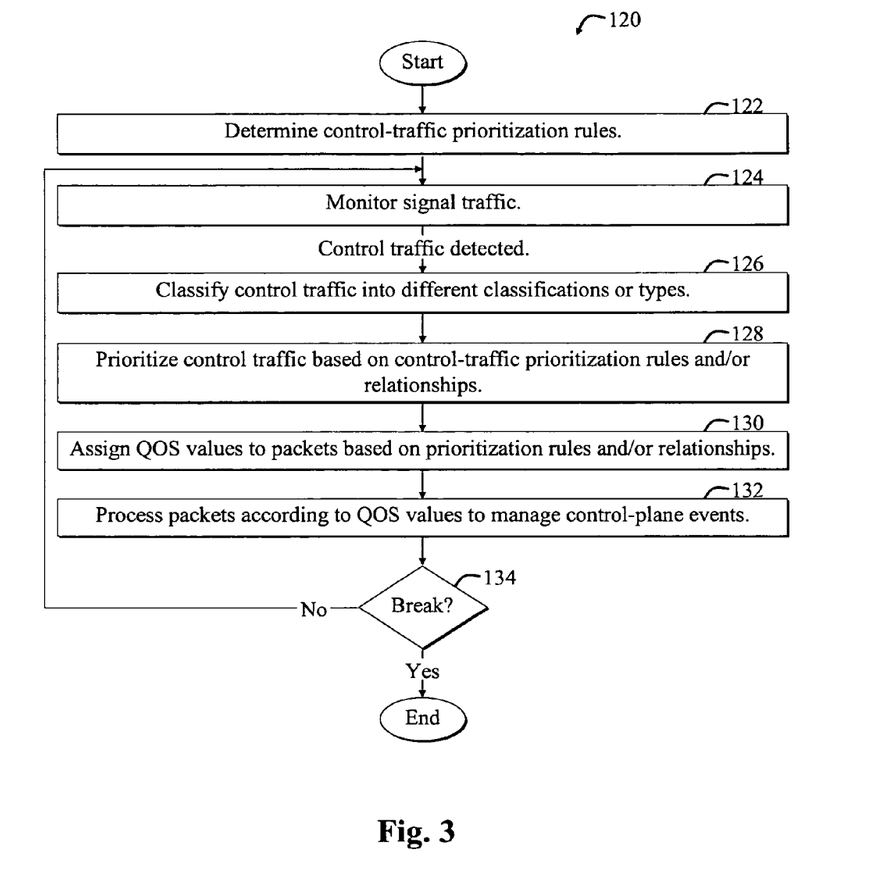
FIG. 3 is a flow diagram of a method adapted for use with the systems of FIG. 1 and 2.

FIG. 3 is a flow diagram of method 120 adapted for use with systems of FIG. 1 and 2. Method 120 includes initial priority-rule-determining step 122, wherein control-traffic prioritization rules are determined. For example, rules defining how types or classes of control signals are mapped to specific QOS values are determined. The rules may be automatically determined or manually determined, such as via a user interface. Subsequently, traffic-monitoring step 124 is performed.

Traffic-monitoring step 124 includes monitoring traffic, such as traffic occurring between alternative wireless AP 76 and alternative central switch 74 of FIG. 2. When control traffic is detected, classifying step 126 is then performed.

Classifying step 126 involves categorizing received control signals based on predetermined types or classes.

Subsequently, in traffic-prioritizing step 128, control signals and/or associated classes are prioritized based on the control-traffic prioritization rules determined in initial priority-rule-determining step 122. After the control traffic is prioritized, it is tagged with corresponding priority values in assigning step 130. The priority values assigned to different control signals and/or messages, which may be implemented via QOS tags, which hare employed to mark control signals based on control-traffic priority as determined in prioritization step 128.

Subsequent processing step 132 involves processing control signals and corresponding packets according to the priority values, i.e., QOS values assigned to the control packets. The processing of the control signals based on QOS values may ensure that high-priority control-plane events are handled before low priority control-plane events. Processing step 132 may occur an AP or at a centralized controller upon receipt of marked control messages.

Next, break-checking step 134 determines if a system break has occurred. A system break may occur if the accompanying network is disconnected or modules implementing method 120 are otherwise disabled. If a system break occurs, method 120 completes. Otherwise, traffic-monitoring step 124 continues.

Various steps 120-134 of method 120 may be omitted, changed, or reordered without departing from the scope of the present invention. For example, method 120 may be replaced with a more generalized method without departing from the scope of the present invention. An exemplary more generalized method involves detecting control traffic and then marking different types of control traffic to facilitate differentiating between types of control traffic. An alternative generalized method involves classifying control traffic in accordance with one or more predetermined rules and providing control-traffic priorities in response thereto and then adjusting behavior of an accompanying wireless network in accordance with the control-traffic priorities.

An alternative more detailed method includes identifying control-plane traffic and then determining if the control-plane traffic has a QOS dependency such that the control-plane traffic pertains to a WLAN control event requiring prioritized handling. Examples of such WLAN control events may include roaming; pre-authentication exchanges associated with roaming, radio performance measurements; security control-plane communications, such as IDS, and TIDP; obtaining location-beaconing information; managing, adjusting, and selecting radio channel frequencies; managing, reporting, and detecting Institute of Electrical and Electronics Engineers (IEEE) 802.11 and non-802.11 interfaces; managing guest-access traffic separation and service selection; designating clients that process real-time IP applications, such as voice or video; determining state conditions of clients including power-on, power-off, sleep-mode, and roaming-mode states; setting roaming-time-reconnection requirements; and so on. When a control-plane event with a QOS dependency is sent from an AP to a corresponding central switch, the event may inherits QOS values from a session QOS-value table. All upstream and downstream QOS-dependent control events may be associated with QOS values and control signal classifications maintained in a session QOS-value table.

With reference to FIGS. 1-3, various embodiments of the present invention may facilitate determining a network QOS policy behavior in response to certain events or and/or guarantees, such as such as roaming events and whether a need exists for session persistence, wherein a client communication session is maintained as the client roams across AP coverage areas; events involving client reauthorizations to APs; guarantees for seamless roaming with session persistence based upon the number of concurrent roaming requests or backlogs of roam requests; and so on.

Various embodiments of the present invention may be employed to enable granular QOS classification and marking for control-plane traffic between an AP and a controller to facilitate avoidance of QOS policy-configuration mistakes. For example, prioritizing control-plane messages so that different priorities are assigned to control messages based on roaming types, may prevent certain QOS policy configuration mistakes that may otherwise result in mis-configured QOS schemes being applied to a WLAN switch deployment.

Certain embodiments of the present invention may provide logical and/or physical separation of data traffic and various types of control traffic in a central WLAN switch. Various QOS-value-assignment schemes may be applied in a control-plane to differentiate and prioritize various control messages, such as reconnection requests based on various traffic types.

Although processes of the present invention and the hardware executing the processes may be characterized by language common to a discussion of the Internet (e.g., "client," "access point," and so on), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used as a client. For example, portable computing devices such as a Personal Digital Assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain, and store, the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using one or more programmed general purpose digital computers; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system comprising:
a first control-traffic-prioritizing module for managing control signals in accordance with control-traffic priorities in a control plane of a wireless network that includes a central switch and at least one wireless access points (APs), the control-traffic-prioritizing module comprising:
a classification engine adapted to (i) receive, from the at least one wireless APs, a stream of signals comprising data signal and control signals, each control signal corresponding to a control-plane event applicable to data signals subsequently communicated over the wireless network; (ii) separate control signals from data signals; and (iii) classify, in the control plane of the wireless network, the separated control signals into a plurality of control signal types;
a QOS-assignment module configured to assign the control-traffic priorities to the separated control signals based on the classified control signal types,
wherein each control signal type is paired with a QOS value indicating a control-traffic priority,
wherein the control signal types include at least one roaming type that is maintained at a control-signal priority higher than at least one non-roaming type control signal type, and
wherein the QOS-assignment module comprises a session QOS table that includes pairs of control-signal type and QOS values;
a message-tagging module configured to tag the separated control signals with the corresponding QOS values indicating the control-traffic priorities;
a queuing module configured to en-queue the separated control signals that have been tagged by the QOS values indicating the control-traffic priorities; and
a control-plane processing engine to process the separated control signals according to the tagged QOS values indicating the control-traffic priorities.

2. The system of claim 1, wherein different control signal types are characterized by different classifications.

3. The system of claim 2, wherein the control signal types further include control signals pertaining to roaming events.

4. The system of claim 2, wherein the control signal types further include control signals pertaining to radio performance measurements.

5. The system of claim 2, wherein the control signal types further include control signals pertaining to security communications.

6. The system of claim 2, wherein the control signal types further include control signals pertaining to managing guest-access traffic separation and service selection.

7. The system of claim 2, wherein the control signal types further include control signals pertaining to location beaconing.

8. The system of claim 1, wherein the control-traffic prioritizer is implemented in a controller on the central switch that is in communication with the at least one wireless access points.

9. The system of claim 1, further comprising a second control-traffic prioritizing module implemented in one or more of the at least one wireless APs.

10. The system of claim 9, the first control-traffic prioritizing module and the second control-traffic prioritizing module are adapted to mark the separated control signals with the corresponding QOS values indicating the control traffic priorities before transmitting the control signals tagged with QOS values to each other.

11. The system of claim 9, wherein the first prioritizing module and the second prioritizing module are adapted to tag the separated control signals with the corresponding QOS values indicating the control traffic priorities before the control signals so tagged are processed by applications employing the control signals.

12. The system of claim 11, wherein the applications employing the control signals further include one or more of the following applications internet protocol (IP) application services, radio-resource management, user load management, mobility management, rogue detection and avoidance, rogue detection and containment, transmit power control, intrusion prevention, radio frequency management, quality of service (QOS), security; mobility, handoff applications.

13. The system of claim 1, wherein the at least one roaming type pertains to a roaming status that includes roam-request backlogs the network.

14. The system of claim 1, wherein the at least one roaming type pertains to a roaming status that includes occurrences of particular roaming events within the network.

15. The system of claim 1, wherein the control signal types include control-plane events, wherein control-plane events are processing steps in a control-plane, and wherein the control-signal priorities associated with the control-plane events are included in the session QOS table.

16. The system of claim 15, wherein the control-plane events include reauthorizations of clients roaming from a first access point coverage area to a second access point coverage area, and wherein the first access point and the second access point communicate with the controller.

17. A non-transitory machine-readable medium including instructions executable by a processor, the machine-readable medium comprising at least one instruction for:
managing control signals in accordance with control-traffic priorities in a control plane of a wireless network that includes a central switch and at least one wireless access points (APs), the managing comprising:
receiving, from the at least one wireless APs, signals comprising data signal and control signals, each control signal corresponding to a control-plane event applicable to data signals subsequently communicated over the wireless network;
(ii) separating control signals from data signals;
(iii) classifying, in the control plane of the wireless network, the separated control signals into a plurality of control signal types;
(iv) assigning the control-traffic priorities to the separated control signals based on the classified control signal types,
wherein each control signal type is paired with a QOS value indicating a control-traffic priority,
wherein the control signal types include at least one roaming type that is maintained at a control-signal priority higher than at least one non-roaming type control signal type, and
wherein the QOS-assignment module comprises a session QOS table that includes pairs of control-signal type and QOS values; and
(v) tagging the separated control signals with the corresponding QOS values indicating the control-traffic priorities;
(vi) en-queuing the separated control signals that have been tagged by the QOS values indicating the control-traffic priorities; and
(vii) processing the separated control signals according to the tagged QOS values indicating the control-traffic priorities.

18. An apparatus comprising:
one or more processors;
a non-transitory machine medium including instructions executable by the one or more processors for:
managing control signals in accordance with control-traffic priorities in a control plane of a wireless network that includes a central switch and at least one wireless access points (APs), the managing comprising:
(i) receiving, from the at least one wireless APs, signals comprising data signal and control signals, each control signal corresponding to a control-plane event applicable to data signals subsequently communicated over the wireless network;
(ii) separating control signals from data signals;
(iii) classifying, in the control plane of the wireless network, the separated control signals into a plurality of control signal types;
(iv) assigning the control-traffic priorities to the separated control signals based on the classified control signal types,
wherein each control signal type is paired with a QOS value indicating a control-traffic priority,
wherein the control signal types include at least one roaming type that is maintained at a control-signal priority higher than at least one non-roaming type control signal type, and
wherein the QOS-assignment module comprises a session QOS table that includes pairs of control-signal type and QOS values; and
(v) tagging the separated control signals with the corresponding QOS values indicating the control-traffic priorities;
(vi) en-queuing the separated control signals that have been tagged by the QOS values indicating the control-traffic priorities; and
(vii) processing the separated control signals according to the tagged QOS values indicating the control-traffic priorities.

19. A method for managing control signals in accordance with control-traffic priorities in a control plane of a wireless network that includes a central switch and at least one wireless access points (APs), the method comprising:
(i) receiving, from the at least one wireless APs, signals comprising data signal and control signals, each control signal corresponding to a control-plane event applicable to data signals subsequently communicated over the wireless network;
(ii) separating control signals from data signals;
(iii) classifying, in the control plane of the wireless network, the separated control signals into a plurality of control signal types;

(iv) assigning the control-traffic priorities to the separated control signals based on the classified control signal types,
- wherein each control signal type is paired with a QOS value indicating a control-traffic priority,
- wherein the control signal types include at least one roaming type that is maintained at a control-signal priority higher than at least one non-roaming type control signal type, and
- wherein the QOS-assignment module comprises a session QOS table that includes pairs of control-signal type and QOS values; and (v) tagging the separated control signals with the corresponding QOS values indicating the control-traffic priorities;

(vi) en-queueing the separated control signals that have been tagged by the QOS values indicating the control-traffic priorities; and (vii) processing the separated control signals according to the tagged QOS values indicating the control-traffic priorities.

* * * * *